United States Patent [19]

Göft et al.

[11] 4,378,858

[45] Apr. 5, 1983

[54] DRIVEN STEERING SHAFT ASSEMBLY

[75] Inventors: Manfred Göft; Dieter Maurer, both of Friedrichshafen; Erich Aucktor, Offenbach, all of Fed. Rep. of Germany

[73] Assignee: Löhr & Bromkamp GmbH, Offenbach, Fed. Rep. of Germany

[21] Appl. No.: 174,174

[22] Filed: Jul. 31, 1980

[30] Foreign Application Priority Data

Aug. 4, 1979 [DE] Fed. Rep. of Germany ....... 2931764

[51] Int. Cl.³ .................. B60K 17/30; F16D 3/84
[52] U.S. Cl. .................. 180/259; 180/254; 308/187.1; 464/50; 464/173
[58] Field of Search ............ 180/254, 255, 258, 259; 64/21, 22, 34 F, 34 R; 308/36.1, 187.1, 187.2

[56] References Cited

U.S. PATENT DOCUMENTS

| | | | |
|---|---|---|---|
| 2,432,803 | 12/1947 | Rice | 64/32 F |
| 3,338,070 | 8/1967 | Scott | 64/21 |
| 4,091,689 | 5/1978 | Huffman | 180/255 |
| 4,094,376 | 6/1978 | Welschof | 64/21 |
| 4,119,167 | 10/1978 | Yamada et al. | 180/259 |
| 4,210,002 | 7/1980 | Dore | 64/21 |
| 4,229,952 | 10/1980 | Aucktor et al. | 64/21 |

*Primary Examiner*—Joseph F. Peters, Jr.
*Assistant Examiner*—Donn McGiehan
*Attorney, Agent, or Firm*—Toren, McGeady & Stanger

[57] ABSTRACT

A driven steering shaft assembly especially for a planetary steering shaft is formed with a universal joint interposed between an axle shaft extending from a differential and a steering shaft for driving a wheel hub or the inner central gear of a planetary set, with the universal joint coupling the axle shaft and the steering shaft together. The universal joint includes an outer joint member coupled with one of the shafts and an inner joint member coupled with the other shaft. A sealing boot is operatively coupled to seal the interior of the universal joint and the sealing boot is releasably attached with the outer joint member of the universal joint. A neck portion of the sealing boot engages the steering shaft in releasable connection therewith but axially slideably movable relative thereto. The sealing boot is formed with an inherent resiliency in the axial direction of the assembly enabling it to adjust to the greatest axial length and permitting the universal joint together with the axial sealing boot to be removed without detachment of the fastening means of the sealing boot.

7 Claims, 5 Drawing Figures

DRIVEN STEERING SHAFT ASSEMBLY

The present invention relates generally to shaft coupling devices and more particularly to a driven steering shaft assembly wherein a universal joint couples an axle shaft extending from a differential mechanism and a steering shaft for driving the wheel hub or the inner central gear of a planetary set. The universal joint may include an outer joint member coupled with one of the shafts and an inner joint member coupled with the other shaft and a sealing boot operatively coupled to seal the interior of the universal joint.

Driven steering shafts, having a planetary reduction gear system in the wheel hub and a partial covering of the shaft joint with a sealing boot are generally known. In mechanisms of this type, the drive is usually effected from a differential gear system through drive shafts or through axle shafts arranged on both sides of the mechanism, with the shafts being, in turn, inserted with their outer shaft stubs so as to be fixed for rotation in the bore of a joint member of a shaft joint which is directed inwardly or arranged interiorly of the system. The outer joint member, or the outwardly directed joint member, is connected to the shaft which performs the steering functions that is the steerable or steering shaft. This steering shaft drives the inner central gear of a planetary gear system in the wheel hub or drives the wheel hub itself.

In modern structures of the type described, individual components such as the axle shafts, the joint shaft and the steering shaft of the universal joint shaft itself may be separated from one another so that in a situation where repair is required these components may be replaced with relative ease and simplicity. This applies particularly to the shaft joint. Structures of this type have the disadvantage however that disassembly of, for example, the steering shaft and of the constant velocity universal joint are capable of being performed only after the fastening of the sealing boot on the steering shaft has been disconnected.

For reasons of the structural configuration of the device, such as the very short axial extension in the region of the constant velocity universal joint, this fastening of the joint which is filled with grease is not easily accessible and the disconnection of, for example, a tightening strap is relatively cumbersome. This fact also must be taken into consideration in designing this portion of such a mechanism and it does not always lead to optimum solutions with respect to space requirements particularly in the axial direction of the assembly.

Accordingly, the present invention is directed toward provision of a construction for a driven steering shaft assembly, particularly a planetary steering shaft assembly of the type herein described wherein the assembly and disassembly of the shaft joint as a unit with the sealing boot and the grease filling will be facilitated and become less cumbersome with replacement of parts being simplified so that the sealing boot will not be subjected to damage or injury from external influences.

SUMMARY OF THE INVENTION

Briefly, the present invention may be described as a driven steering shaft assembly especially for a planetary steering shaft which includes a universal joint interposed between an axle shaft extending from a differential and a steering shaft for driving the wheel hub or the inner central gear of a planetary set. The shafts are coupled together through the universal joint with the universal joint including an outer joint member coupled with one of the shafts and an inner joint member coupled with the other of said shafts. A sealing boot is operatively coupled to seal the interior of the universal joint and means are provided for releasably attaching the sealing boot to the outer joint member of the universal joint. The sealing boot includes a neck portion engaging the steering shaft in sealing connection therewith but axially slideably movable relative thereto. The sealing boot is formd with an inherent resiliency in the axial direction of the assembly enabling adjustment to the greatest axial length and permitting the universal joint together with the sealing boot to be removed without detachment of the fastening means of the sealing boot.

Thus, without disconnecting the fastening means of the sealing boot, the steering shaft can be pulled out of the constant velocity universal joint by removing the axial securing means of the steering shaft. The constant velocity universal joint is accessible when the steering is fully deflected and the joint may be disassembled and also reassembled. The constant velocity universal joint with the sealing boot is simply pulled from the axle shaft and is lifted out to the side. The sealing boot need merely be compressed in the direction of the joint member. Even if only the sealing boot is to be replaced, it is advantageous to jointly disassemble the constant velocity universal joint and the sealing boot and to perform replacement outside of the vehicle since this can be accomplished in a much more convenient manner simply by disconnecting a clamping strap or other clamping device. The assembly of a constant velocity universal joint with a sealing boot is possible in the same simple manner wherein a new grease filling which may also possibly be required can be provided in place outside of the vehicle.

When the sealing boot is compressed, the lubricant will be in the bore of the inner joint member so that after mounting of the two shafts the lubricant will be uniformly distributed radially outwardly through the balls of the joint. Thus, the lubricant reaches those parts which are to be supplied with lubricating medium.

Since the assembly of a complete constant velocity universal joint is now formed merely by sliding on of the components, the design of the steering shaft may be provided in an advantageous manner with respect to its axial dimension. This may enable an even shorter distance between the joint and the wheel hub which will contribute to improvement of steering deflection. Additionally, the sealing means can be covered more effectively which in turn will result in better protection so that damage caused by outside influences will occur less frequently.

In accordance with a further aspect of the invention, a sleeve is arranged between the sealing boot and the steering shaft. In this embodiment of the invention, by utilization of the sleeve in connection with the sealing boot, an optimum sealing effect is derived and an especially favorable assembly and disassembly of the steering shaft can be achieved particularly if the sleeve is additionally provided with an O-ring.

By a further embodiment of the invention the sealing between the sealing boot or the sleeve of the sealing boot and the steering shaft is provided at the end face of a shoulder formed on the shaft. In this embodiment, the sleeve may be designed very simply because the sealing effect will be effected at the end face. When utilizing a sleeve in connection between the sealing boot and the steering shaft, the bore in the sleeve may be selected so that the steering shaft may be easily inserted therein. Since an O-ring need not be provided, there is also no obstruction between the sleeve and the steering shaft and the tension of the sealing boot will press the sleeve axially outwardly against the shoulder at the end face of the steering shaft.

In a further embodiment of the invention, the sealing between the sealing boot and the shoulder of the steering shaft is effected by means of a sealing lip of the sealing boot. In this embodiment, which will depend upon the requirements in each case of its application, the sleeve may be connected to the sealing boot through an inherent tension in a small opening of the sealing boot. However, it is also possible to use clamping devices such as, for example, a clamping strap. In order to simplify the construction of the assembly of the invention while simultaneously optimizing the connection which is provided, the connection may be effected so that the sealing lip at the sealing boot also overlaps a second sealing cylindrical face of the steering shaft. This connection may be effected in accordance with this embodiment of the invention for example by vulcanizing the sleeve onto the sealing boot.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
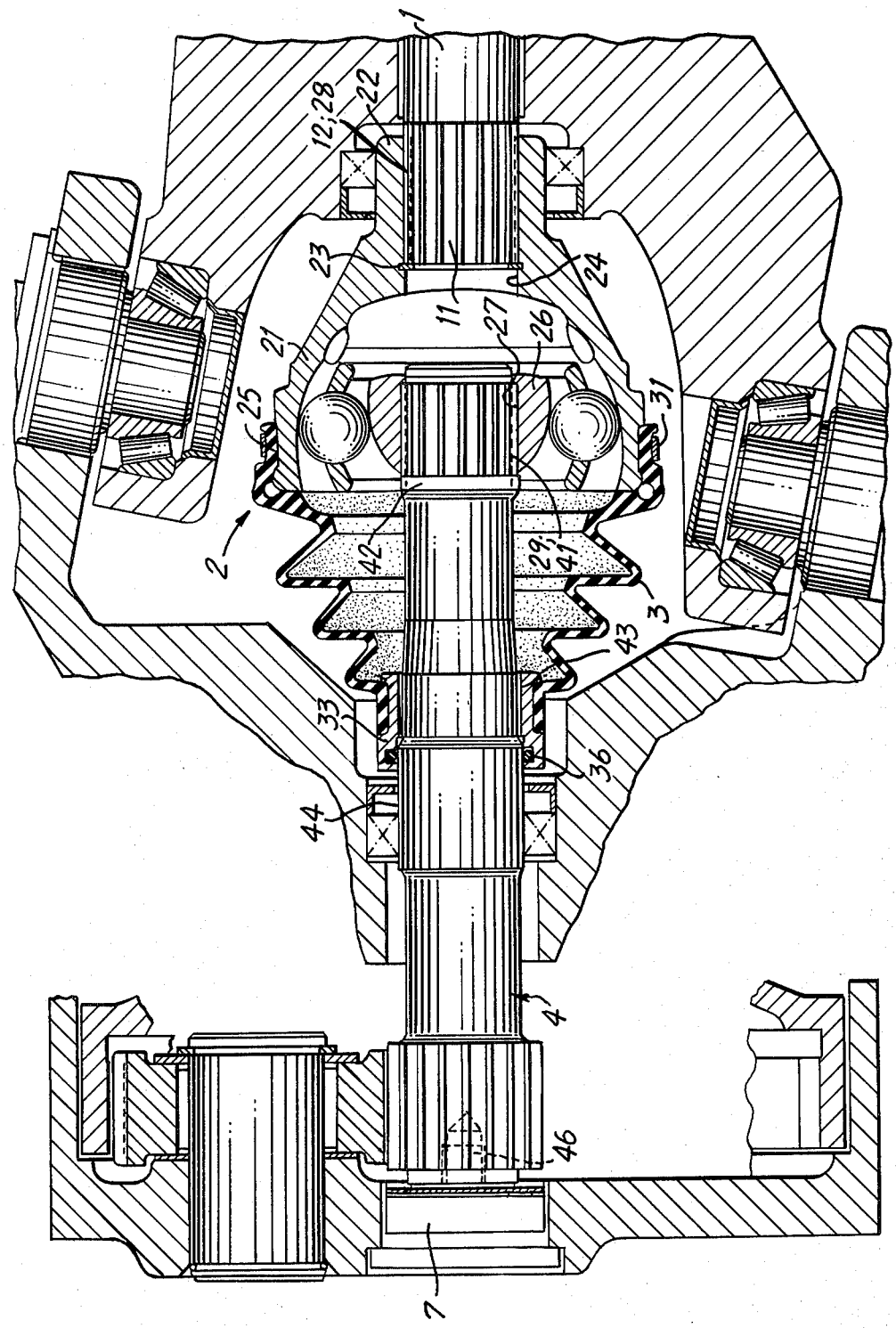
FIG. 1 is an axial sectional view of an assembly in accordance with the present invention.

Referring now to the drawings, wherein similar reference numerals are used to identify similar parts throughout the various figures thereof, there is shown, particularly in FIG. 1, a steering shaft assembly in accordance with the present invention which includes an axle shaft 1 driven by a differential or distribution gear system (not shown) and including a driving mechanism 12, which may comprise gear teeth provided on the outer stub 11 of the shaft 1.

The assembly includes a constant velocity universal joint 2 having an outer joint member 21 formed with internal teeth 28 located at a neck 22 of the outer joint member 21 and arranged to engage with the external teeth 12 of the shaft stub 11. The universal joint 2 is secured against unilateral axial sliding movement relative to the axle shaft 1 by means of a lock ring 23 engaged within a bore 24 of the outer joint member 21.

The outer joint member 21 of the constant velocity universal joint 2 surrounds an inner joint member 26 in the usual manner and, at the largest diameter portion of the outer joint member 21, there is formed a shallow groove 25 to enable fastening thereat of a sealing boot 3 by means of a tightening strap 31.

The inner joint member 26 of the universal joint 2 is formed with a bore 27 having internal driving teeth 29 and adapted to slide into driving engagement with driving teeth 41 of a steering shaft 4 of the assembly. A ring or shoulder 42 on the steering shaft 4 insures unilateral axial affixation of the elements of the assembly.

At approximately the middle of its length, the steering shaft 4 is formed with a pair of cylindrical sealing faces 43 and 44. One of these faces is for the housing of the wheel hub gear system which is filled with oil and the other is for sealing the interior of the constant velocity universal joint 2.

Between the steering shaft 4 and the sealing boot 3 a sealing means is provided which comprises an O-ring 36 inserted into a sealing sleeve 33.

Figure 2:
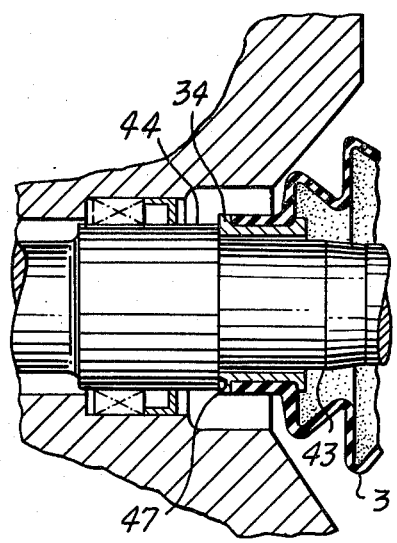
FIG. 2 is a sectional view of a detail of the assembly of FIG. 1 showing a seal of the interior of the constant velocity universal joint between a sleeve and a shoulder of the steering shaft at an end face thereof.
Figure 4:
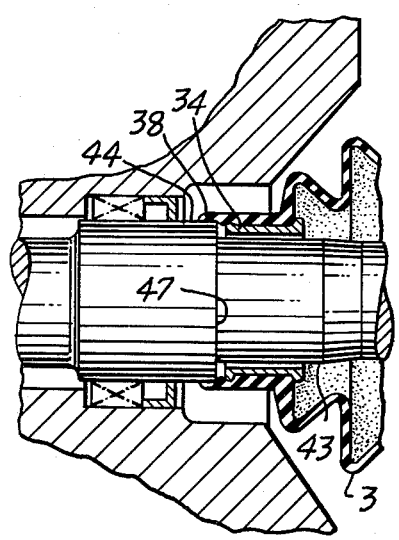
FIG. 4 is a sectional view showing an alternative solution along the lines shown in FIG. 3 with a sealing lip which overlaps a cylindrical face of the shaft.

FIG. 2 shows a seal assembly of a type which is also shown in FIG. 4, that is a seal assembly which includes a sleeve 34 connected with the sealing boot 3 and which bears in sealing engagement against a shoulder 47 of the steering shaft 4.

Figure 3:
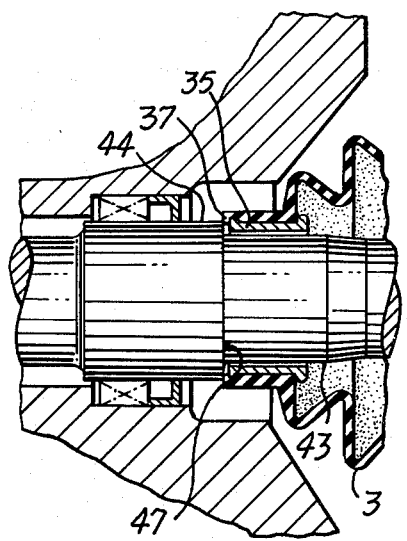
FIG. 3 is a sectional view showing a detail of an assembly in accordance with FIG. 1 wherein a seal of the interior of the constant velocity universal joint at the end face of the shoulder of the steering shaft is formed by means of a sealing lip of the sealing boot.

FIG. 3 depicts an embodiment of the invention wherein a relatively simple solution to the assembly function is provided but which is also very effective to perform the required operating characteristics such as providing a good seal while enabling assembly and disassembly of the device in a relatively simple manner. The sleeve 35 is of a stable shape and facilitates effective assembly and disassembly of the steering shaft 4 because of its inner diameter which is greater than the diameter of the cylindrical sealing face 43 of the steering shaft 4. The sealing lip 37 of the sealing boot 3 insures a more favorable seal with respect to the material because it is supported upon the shoulder 47 at the end face of the steering shaft 4.

When the sealing lip 38 is formed to slightly overlap the second cylindrical sealing face 44, an optimum seal will be achieved while nevertheless retaining a rather simple structural configuration as will be best seen in FIG. 4.

Figure 5:
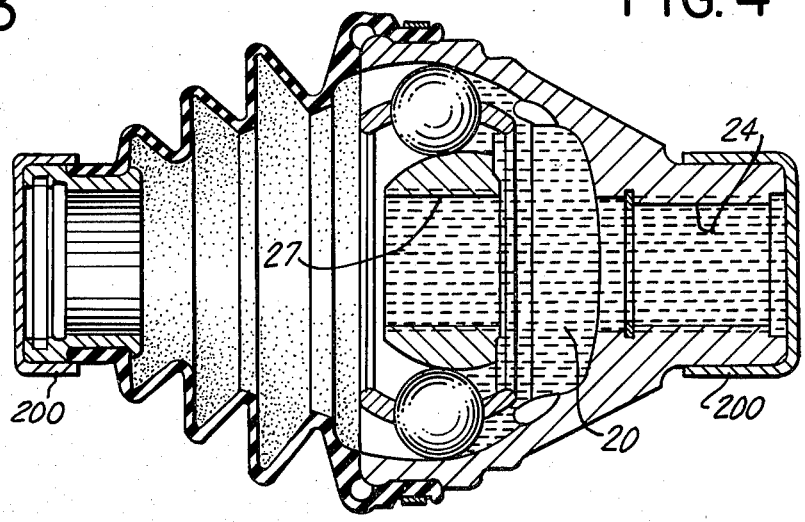
FIG. 5 is a sectional view showing a complete constant velocity universal joint.

FIG. 5 shows a complete constant velocity universal joint in the form in which it may be kept in storage for subsequent assembly both in the case of a new installation or as a replacement part. The bores 24 and 27 and the internal space 20 located therebetween are filled with grease and protective caps 200 are provided to prevent foreign matter and dust from entering the joint.

The constant velocity universal joint may be disassembled in a very simple manner. After removing the plug 7, without loosening any clamping device at the sealing boot, the steering shaft 4 may immediately be pulled outwardly with the aid of a removal device 46. The outward swivelling of the constant velocity universal joint after removal from the axle shaft 1 occurs during complete steering deflection.

It is also a special advantage of the invention that the constant velocity universal joint may be maintained in storage as a complete assembly. Installation of the universal joint also is accomplished in a simple manner after the protective caps 200 are removed simply by slipping the universal joint onto the axle shaft 1 and inserting the steering shaft 4 into the sleeve of the sealing boot as well as into the internal teeth 28 of tue universal joint.

While specific embodiments of the invention have been shown and described in detail to illustrate the application of the inventive principles, it will be understood that the invention may be embodied otherwise without departing from such principles.

What is claimed is:

1. A driven steering shaft assembly especially for a planetary steering shaft comprising: a universal joint interposed between a first and a second shaft coupled therethrough; said universal joint including an outer joint member coupled with said first shaft and an inner joint member coupled with said second shaft; means interconnecting said inner joint member and said second shaft in rotative driving engagement while permitting assembly and disassembly therebetween by axial movement of said second shaft relative to said inner joint member; a resilient sealing boot mounted to seal therein said universal joint, said sealing boot having at one end thereof a neck portion mounted in sliding engagement with said second shaft and, at an opposite end, means releasably fastening said sealing boot to said outer joint member of said universal joint; a cylindrical sealing face on said second shaft having said neck portion of said sealing boot engaged thereabout; a sleeve arranged between said cylindrical sealing face and said neck portion of said sealing boot, said neck portion being structured to create an inherent resilient spring force about said sleeve for holding said sleeve in tight sliding engagement on said cylindrical sealing face; a shoulder formed on said second shaft on the outside of said sealing boot adjacent said neck portion, said shoulder having a radially extending end face facing toward said sealing boot in sealing engagement with at least one of said sleeve and said neck portion; said sealing boot having an inherent resiliency in the axial direction of said assembly enabling adjustment to its greatest axial length and permitting assembly and disassembly between said second shaft and said universal joint together with said sealing boot by axial movement relative thereto of said second shaft without detachment of said fastening means of said sealing boot; said resiliency in the axial direction of said sealing boot operating to maintain said sealing engagement between said end face and said at least one of said sleeve and said neck portion.

2. An assembly according to claim 1 wherein said first shaft is an axle shaft and wherein said second shaft is a steering shaft for driving a wheel hub or an inner central gear of a planetary set.

3. An assembly according to claim 1 wherein said sleeve has an inner diameter which is larger than the corresponding outer diameter of said cylindrical sealing face.

4. An assembly according to claim 1 wherein sealing engagement between said neck portion and said shoulder of said second shaft is effected by means of a sealing lip of said neck portion.

5. An assembly according to claim 4 wherein said second shaft includes a second cylindrical sealing face and wherein said sealing lip of said sealing boot overlaps said second cylindrical sealing face.

6. An assembly according to claim 1 wherein said sleeve is firmly connected with said neck portion of said sealing boot.

7. An assembly according to claim 6 wherein said connection of said sleeve with said neck portion of said sealing boot is detachably formed.

* * * * *